Nov. 18, 1941.    C. M. JOHNSON    2,263,302
LIPSTICK MACHINE
Filed July 28, 1939    4 Sheets-Sheet 1
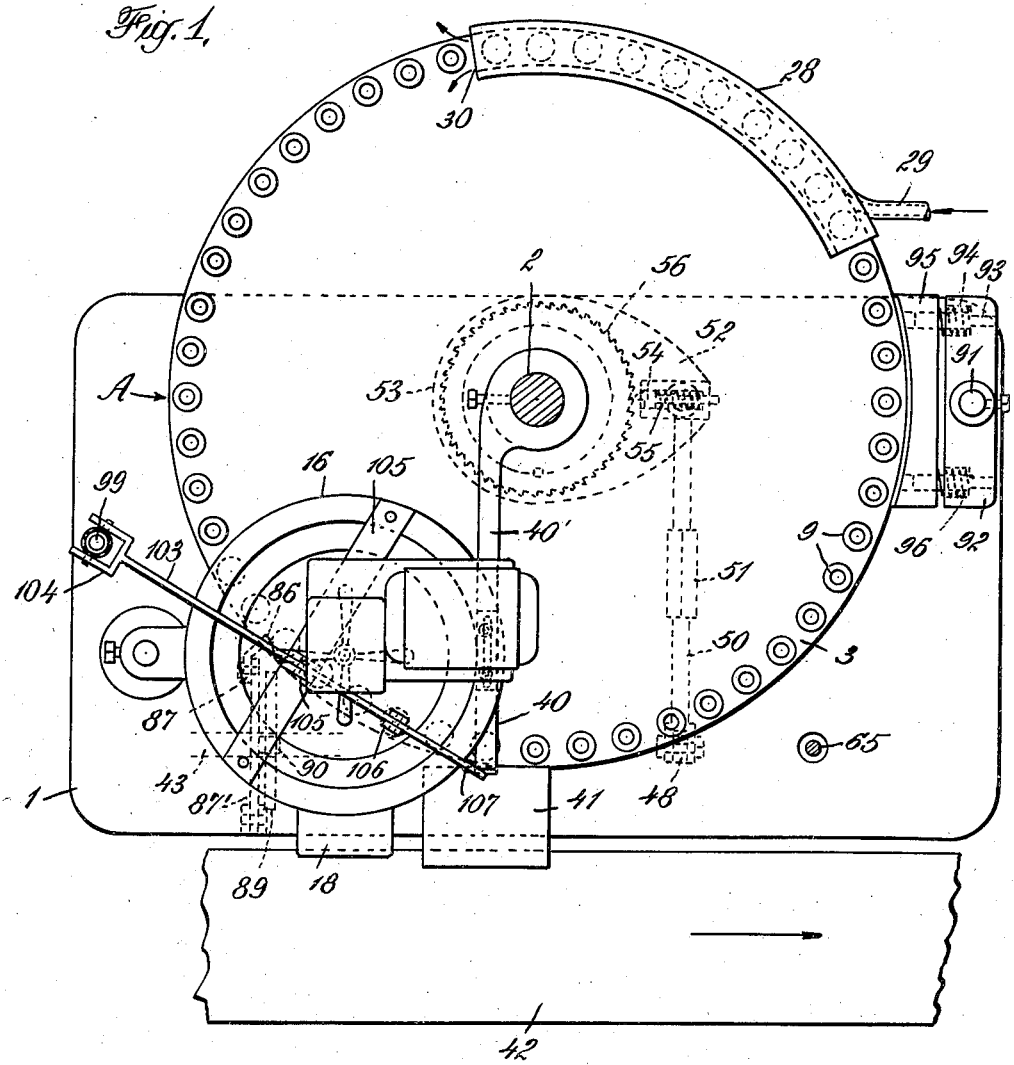
INVENTOR
Clifford M. Johnson
BY
Pennie, Davis, Marvin & Edmonds
ATTORNEYS

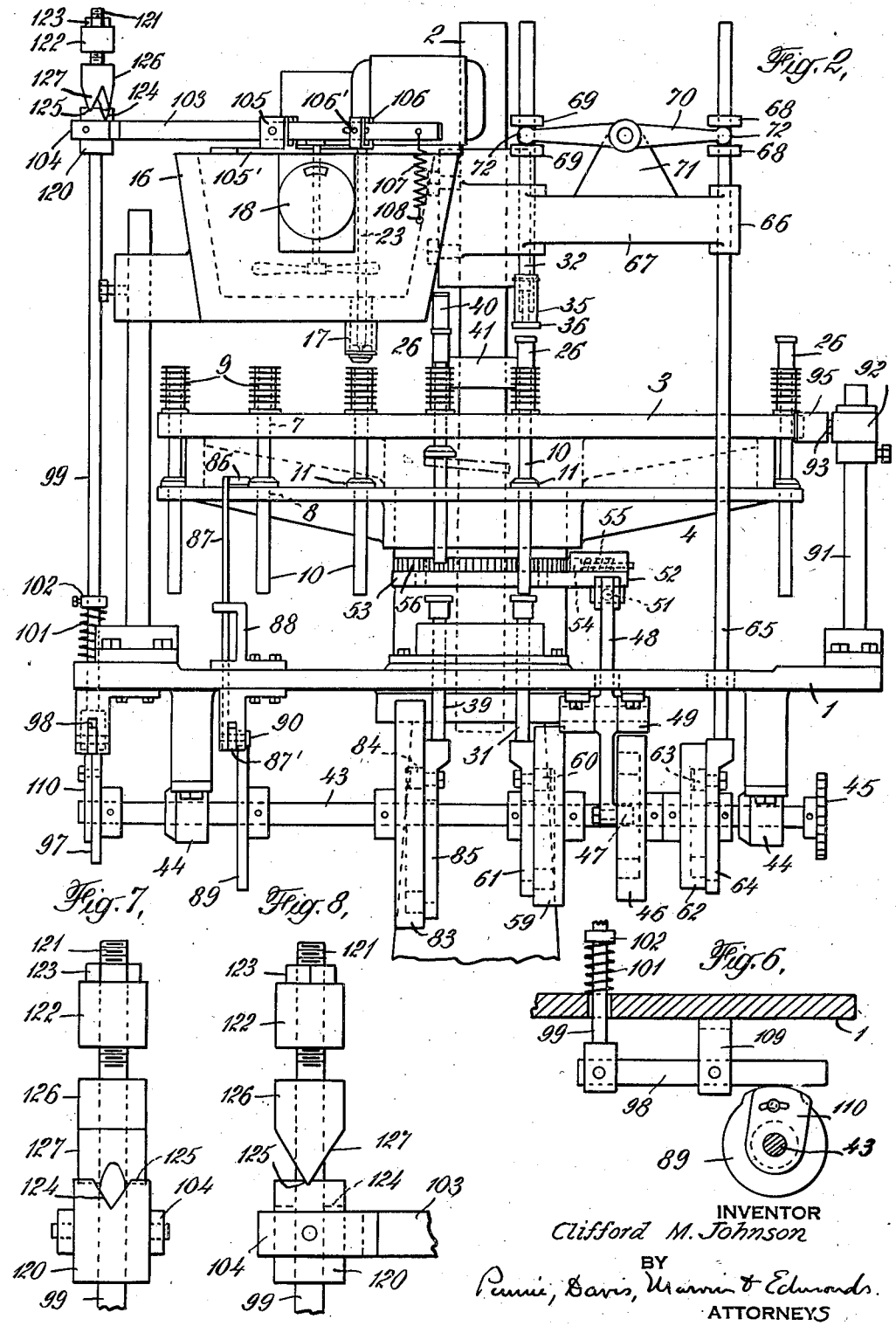

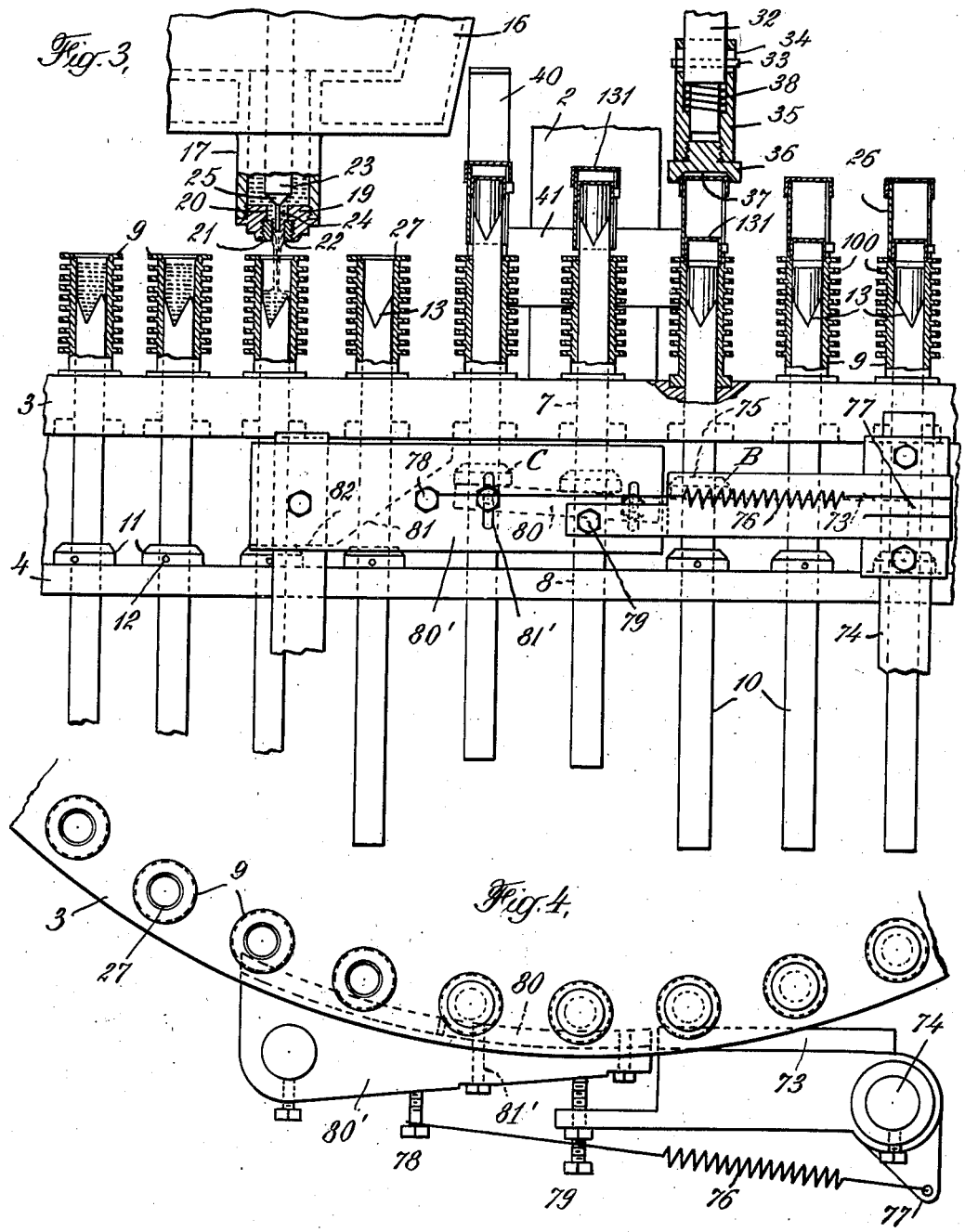

Nov. 18, 1941.  C. M. JOHNSON  2,263,302
LIPSTICK MACHINE
Filed July 28, 1939  4 Sheets-Sheet 4
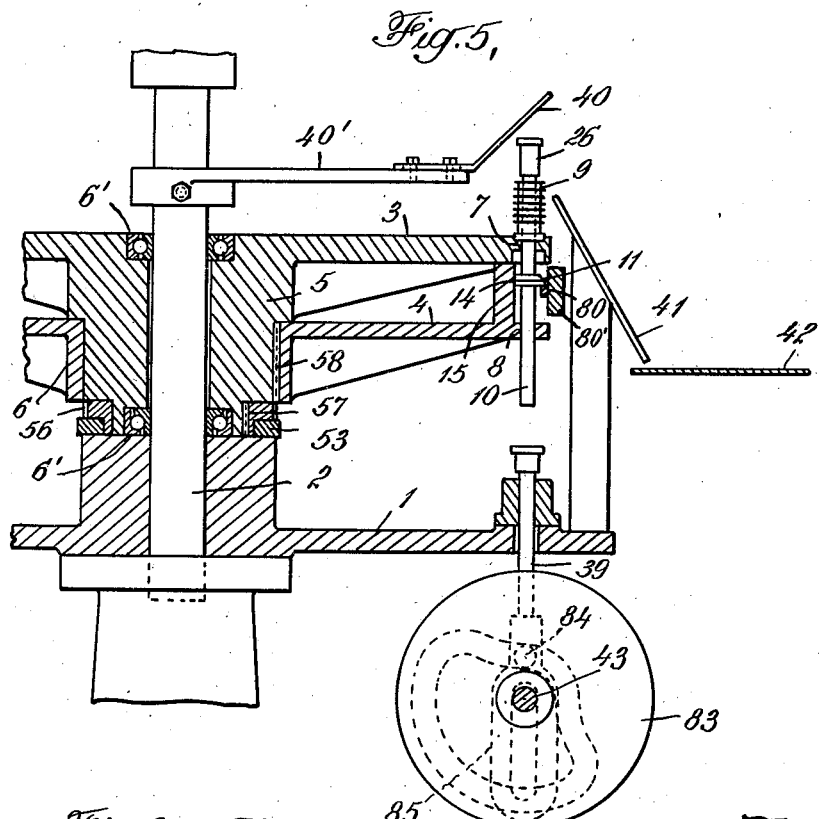
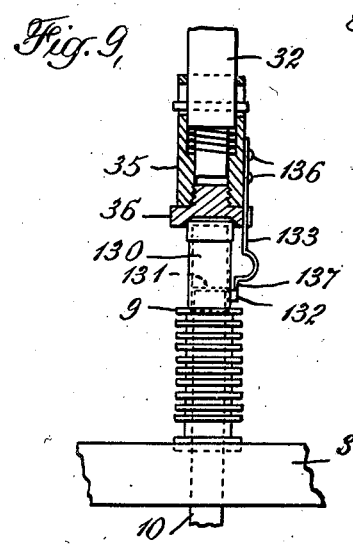
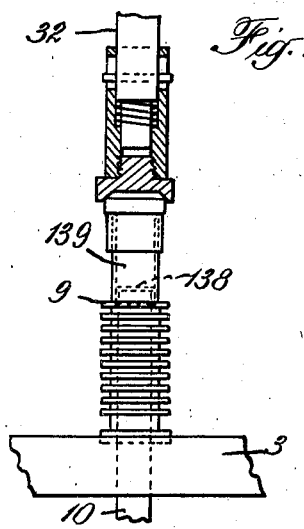
INVENTOR
Clifford M. Johnson.
BY
Pennie, Davis, Marvin & Edmonds
ATTORNEYS Patented Nov. 18, 1941

2,263,302

UNITED STATES PATENT OFFICE 2,263,302

LIPSTICK MACHINE

Clifford M. Johnson, Suffern, N. Y., assignor to Allied Products, Inc., New York, N. Y., a corporation of New York Application July 28, 1939, Serial No. 286,983

5 Claims. (Cl. 18—20)

This invention relates to a method of and apparatus for making lip sticks and similar products.

The present method of manufacturing lip sticks involves much hand labor and results in heavy losses or rejections. According to the present method a box containing a number of split molds is placed under a heated kettle or container in which the material to form the lip sticks is kept in a molten condition and the molds are filled by hand, an operator manipulating a valve to pour the material from the kettle into the molds. The operator then removes the excess material from the top of the molds and returns it to the container. The lip stick material is heated to a temperature of from 200 to 210° F. and must therefore be cooled before further operations. The molds are passed through a suitable cooling apparatus and the molded lip sticks are then ready for further operations.

The molds are removed from the cooling apparatus, the sections opened and the molded lip stick removed by hand. A number of the molded lip sticks are then taken to a traveling belt having spaced supports thereon and the bases of lip stick holders are mounted in these supports by operators. The molded lip sticks are then placed in the lip stick holders by hand. As the lip sticks pass along the belt, they travel between two gas burners. The flames from these burners soften the outside of the molded lip sticks and remove finger marks and the like from them. The base of the lip stick holders containing the lip sticks are then removed from the supports by hand and the caps applied thereto.

Due to the number of hand operations involved, the production of lip sticks in this manner is limited and an excessive amount of hand labor is involved. Furthermore many of the lip sticks are marred in handling and are rejected. While the material of the rejected lip sticks may be reused, the labor costs are greatly increased by such rejections.

In the present invention I provide an apparatus for manufacturing lip sticks in which all handling of the lip sticks is avoided. This not only results in a material reduction in labor costs and in rejections due to injury to the molded lip sticks in handling, but it also provides a more sanitary practice by eliminating personal handling of the product. The apparatus consists of a support or table carrying a plurality of dies or molds. These dies or molds are in the form of cylinders provided with fins on their exterior for cooling. The table is caused to travel with a step by step movement and the material to form the lip sticks is fed to each die by a valve regulated to supply the proper amount. The material from which the lip sticks are to be formed is heated to a temperature from 156 to 166° F. and it therefore requires less cooling than in the prior art practice. By using dies in the form of cylinders, the surface of the finished lip sticks is smooth without the line or seam which is formed by the use of split dies. Also the use of a lower temperature eliminates foaming or bubbling and produces a better product.

A plunger is arranged in the lower portion of each die with the top of the plunger shaped to form the pointed end of the lip stick. At the filling station, the proper amount of lip stick material is poured into the die on top of this plunger. An operator then places the base portion of a lip stick in the die, the upper portion of the bore of the die being slightly recessed to properly center the lip stick holder with respect to the lip stick. The material is allowed to cool and partly solidify in its travel through the next several stations. Under normal conditions cooling may be effected by exposure to the atmosphere of the room, the cooling operation being facilitated by the fins or cooling surfaces on the dies, but in extremely hot weather a blast of air may be blown over the dies during this portion of the operation. The die containing the lip stick with the holder arranged over it then moves to a station at which an upper spring-pressed plunger is arranged and this plunger moves against the inverted bottom of the lip stick holder to hold it in position while the lower plunger moves upwardly in the die to force the lip stick into the holder. At the next station the lower plunger moves further upwardly to eject the lip stick and lip stick holder from the die.

In carrying out the invention I provide an upper table in which the dies are mounted and a lower table which carries the plungers which enter the bottoms of the dies and support the lip stick material. These tables are rotated with a step by step movement and at one point in the rotation of the tables, the lip stick material is delivered from a container in measured quantity to each die as the die passes under it. The feed of the lip stick material is automatically controlled by suitable cam mechanism from a main drive shaft. The die containing the lip stick material then moves past an operator who places the bottom portion of a lip stick holder on top of the die in inverted position. The dies are preferably provided with fins for cooling and in traveling around the machine the lip stick material solidifies. At a point near the end of the revolution a tappet arm, controlled by a cam, engages the plunger to force the lip stick material into the holder and at the same time an upper spring-pressed plunger engages the inverted lip stick holder to retain it in position while the lip stick material is being forced into it. At a further point the plunger is moved further up into the die to eject the completed lip stick from the holder.

In the accompanying drawings I have shown one form of the invention. In this showing:

Fig. 1 is a plan view, partly in section, of the machine;

Fig. 2 is an elevation of the machine with some of the cams, dies, and other operating mechanism removed for clarity of presentation;

Fig. 3 is an enlarged side elevation of a portion of the table and dies and associated cams;

Fig. 4 is a plan view of the portion of the table shown in Fig. 3 of the drawings;

Fig. 5 is a detailed, sectional view of the upper and lower tables showing the ejecting mechanism;

Fig. 6 is a detailed view of a cam controlling the feed valve;

Figs. 7 and 8 are additional detailed views of a portion of the feed valve operating mechanism;

Fig. 9 is a detailed view of the upper plunger showing the construction employed when the lip stick and elevator are to be retained in an extended position in the bottom of the lip stick casing; and Fig. 10 is a similar view of the upper plunger construction employed when the lip stick and lip stick elevator are to be moved into the casing.

The machine comprises a suitable base or frame 1 having a central shaft or spindle 2 mounted thereon and adapted to receive an upper table 3 and a lower table 4. The upper table is provided with a central hub 5 mounted in suitable bearings 6' on the spindle and the lower table is provided with a sleeve 6 surrounding a portion of the hub 5. Each of the tables is provided with a plurality of aligned openings 7 and 8 arranged adjacent the periphery. Dies 9 are arranged on the upper table in alignment with these openings, the dies being secured to the table in any suitable manner. As shown the dies are in the form of cylinders open at their tops and bottoms and provided with fins 100 on their outer surfaces. Each die has associated therewith a plunger 10 which is normally arranged within the die as shown and which extends through the openings 7 and 8 and depends below the lower table 4. Collars 11 are secured to the plungers in any suitable manner as by set screws 12 and these collars normally ride upon the lower table to position the upper end of the plunger at the desired point in the die. It will be apparent that when different sized lip sticks are being made the normal position of the plunger within the die can be regulated by changing the position of the collars 11. The upper end of the plunger is provided with a substantially V-shaped concavity 13. When the lip stick material is poured into the die the end 13 of the plunger forms the bottom of the die or mold and thus produces the pointed end normally provided on lip sticks. Other shaped lip sticks may be made by suitably shaping the upper end of the plunger as will be apparent. Collars 11 may be provided with a flattened face 14 which engages a flange 15 on the bottom of the upper table to prevent rotation of the plungers 10. When the plungers are placed in the machine they are arranged with the V ends extending radially and this facilitates ejection of the completed lip stick as will be hereinafter explained. The flattened portion 14 of the collar engaging the flange 15 retains the end of the plunger in the desired position and prevents rotation.

The material from which the lip stick is to be molded is delivered from a heated hopper or kettle 16 which is arranged over the tables and is provided with a delivery spout 17. The material must, of course, be maintained in a molten condition and this is done by any suitable heating means such as an electric heater. A thermostat 18 may be provided to maintain the lip stick material at the desired temperature. The bottom of the delivery spout 17 is threaded and receives a plug 19 having a central opening 20 therein. This opening is enlarged adjacent its lower end and the enlarged portion is threaded for the reception of a second plug 21. The plug 21 is provided with a central opening 22 of less diameter than the opening 20. A valve member 23 is arranged within the kettle 16 and is provided with a lower end 24 of reduced diameter, the lower end being connected to the body of the valve member by a tapering portion 25. The lip stick material is permitted to flow into each of the dies 9 as the die comes to a position of rest beneath the delivery spout 17, the operation of the valve 23 and the feed of the table being coordinated. After the proper quantity of material has been fed to the die, the die is fed around the table by the step by step movement and at a point beyond the container 16 indicated at A in Fig. 1 of the drawings an operator places an inverted lip stick holder 26 over the lip stick material in the die. As shown the upper end of the bore of the die is recessed as at 27 to aid in positioning and centering the lip stick holder. The lip stick material cools and solidifies as the die progresses around the table and in many instances the fins 100 provide sufficient cooling to solidify the lip stick material before the lip stick is ejected from the machine. In extremely hot weather, however, artificial cooling may be necessary and for that purpose I provide a hood 28 extending throughout an appreciable portion of the machine and through which the dies containing the lip stick material and holders pass. Cooling air may be delivered to this hood through a pipe 29 and may be exhausted into the room at the opposite end as indicated at 30.

Prior to the ejection of the lip stick and holder from the machine (at station B in Fig. 3) a tappet 31, which is mounted in an opening in the frame 1 and controlled by a cam, engages the plunger 10 to move it and the lip stick material upwardly in the die 9. At the same time, the lip stick holder is engaged by an upper plunger 32 to retain the lip stick holder in position on top of the die and cause the lip stick material to move into the holder. The upper plunger comprises a rod which is cam actuated and which is provided with a transverse pin 33 adjacent its lower end. This pin is received in slots 34 in a sleeve-like member 35 which forms the head of the plunger to permit relative movement between the rod 32 and the head 35. The lower end of the sleeve is threaded for the reception of an engaging member 36, the face of which is recessed as at 37 and this recess properly centers the lip stick holder with respect to the die and the lip stick material. The head is normally retained in extended position by a spring 38 which is arranged within the sleeve 35 and engages a shoulder adjacent the end of the rod 32.

At a station just beyond the station at which the upper plunger is provided, a tappet 39 is carried by the frame 1 and the head of this tappet is adapted to engage the plunger 10 and move it upwardly in the die to force the molded lip stick out of the holder as indicated at C in Fig. 3 of the drawings. When the plunger moves upwardly, the lip stick holder engages an inclined plate 40 which is carried by an arm 40' secured to the spindle 2 and this tips the lip stick and lip stick holder causing it to fall upon an inclined plate 41 arranged adjacent the edge of the table 3 and to be delivered to a moving belt 42 (see Fig. 5).

The machine is driven from a suitable drive shaft 43 mounted in bearings 44 carried on the under side of the frame 1 and connected to a source of power by suitable means, such as sprocket wheel 45 arranged on one end of the shaft. This shaft carries a number of cams for operating the different parts of the machine. As shown a cam 46 has a cam track for the reception of a roller 47 mounted on the end of an arm 48 which is pivoted in a bracket 49 carried by the frame of the machine. The upper end of this arm is connected to a link 50 which extends towards the center of the machine and is provided with a turn buckle 51 for adjustment. The end of link 51 is connected to an ear 52 mounted on a collar 53 which is loosely mounted on the spindle 2. This collar carries a pawl 54 which is urged toward the center of the machine by a spring 55 and which engages the teeth of a ratchet 56. The ratchet 56 surrounds the hub 5 of the upper table and is keyed thereto as at 57 and the sleeve 6 of the lower table is likewise keyed to the hub as at 58. It will thus be apparent that the cam 46 imparts a reciprocating movement to the link 50, which in turn oscillates the collar 52 and ear 53 and the engagement of the pawl 54 with the ratchet 56 imparts a step by step movement to the tables.

Tappet 31, which slightly elevates the plunger to feed the lip stick into the lip stick holder, is controlled by a cam 59 which is mounted on the shaft 43 and which has a groove receiving a roller 60 carried by a cam follower 61. The tappet is secured to the cam follower and the cam follower raises it at the proper time to move the plunger upwardly. Another cam 62, mounted on the shaft 43, is provided with a groove for the reception of a roller 63 carried by a cam follower 64 and this cam follower actuates a vertical rod 65 which extends up through an opening in the frame and through a sleeve 66 carried by an arm 67 secured to the spindle. Above the sleeve 66 the rod 65 is provided with a pair of collars 68 and rod 32 of the upper plunger is provided with a pair of similar collars 69. An arm 70 is pivoted on an ear or bracket 71 carried by the arm 67 and has rounded ends 72 which are received between the collars 68 and 69 whereby the reciprocation of the arm 65 causes reciprocation of the arm 32 and the upper plunger 35.

When the plunger is engaged by the tappet 31 and moved upwardly, it is retained in its raised position by a cam shown in Figs. 3 and 4 of the drawings. As shown a cam 73 is mounted on a rod 74 carried by the frame of the machine and this cam is adapted to engage the collar 11 as shown in dotted lines at 75 in Fig. 3 of the drawings when the plunger is raised. The cam is pivotally mounted to permit it to move outwardly and allow the collar to pass on the upward movement of the plunger but is normally retained in its operative position by a spring 76, one end of which is secured in an ear 77 of the cam and the other end of which is secured to a bolt 78 mounted on a stationary portion of the machine. The movement of the cam inwardly can be regulated by an adjusting screw 79 which passes through the end of the cam member and engages an adjacent part of the machine. A second cam 80 is provided over which the collar 11 rides after leaving the cam 73. This cam 80 is secured by bolts to a plate 80' on the frame of the machine, the plate being provided with slots 81' so that the angle of the cam plate 80 may be adjusted as desired. At the station B when the lip stick is forced into the lip stick holder, the lip stick holder remains in position in the recess 27 in the top of the die. When the collar 11 moves from the full line position shown at the station B to the dotted line position, the elevator 131 in the base of the lip stick holder is moved to a retracted position and when the collar 11 passes on to the cam 80 at the lower end of the cam, the molded lip stick and elevator are retracted into the base of the lip stick casing as shown at the next station to the left. As the collar rides upwardly on the cam 80, the plunger is further lifted until it projects from the top of the die and the lip stick casing is removed from the recess 27. The lip sticks may then be removed by hand as the collar travels along cam 80 or the ejecting device actuated by tappet 39 may be employed to remove the lip stick and holder from the die. As the collar rides off the cam 80, its upper surface engages an inclined guide or cam 81 which is formed by a plate carried by the plate 80' to insure the return of the plunger to its lower position prior to delivery of the lip stick material from the container 16. The plate having the inclined face 81 is also provided with a face 82 parallel to the lower table and spaced therefrom a sufficient distance for the collar 11.

Tappet 39 is controlled by a cam 83 provided with a groove for the reception of a roller 84 carried by a cam follower 85 to which the tappet is secured.

I further provide means for engaging one of the plungers or other moving part of the machine at the end of each movement to assure alignment of the various moving parts with the stationary parts. A horizontal arm 86 extends over the edge of the lower table (see Fig. 2) and engages one of the collars. This arm is connected to a vertical arm 87 which passes through an opening in the frame and through an aligned opening in an arm or bracket 88 mounted on the frame. Arm 87 is reciprocated by means of an arm 87' connected to the lower end of the arm 87 and carrying a roller 99 which rides on a cam 89 on the shaft 43. As the machine comes to a state of rest, the cam permits the arms 87 and 87' to lower to cause the arm 86 to come into the path of movement of the collar and prevent further rotation of the table. Prior to the next movement of the table, the arm 87 is lifted moving the arm 86 upwardly in the space between the tables and out of the path of the collar 11.

I also provide a brake to assist in stopping the movement of the tables. As shown a bracket 91 is mounted on the frame of the machine and extends upwardly into proximity with the upper table. This bracket carries a plate 92 which is bored for the reception of studs 93 and the inner ends of the openings are enlarged as at 94 forming shoulders. A brake member 95 shaped to conform to the edge of the table is mounted on the studs and is normally pressed toward the table by springs 96 arranged in the enlarged end 94 of the bores and engaging the outer face of the brake plate 95.

Operation of the valve 23 and control of the feed of the molten material from the delivery spout 17 is controlled by a cam 97 mounted on the shaft 43. This cam engages a pivoted arm 98 mounted in a bracket 109 on the frame of the machine and having its outer end connected to a vertical rod 99. Rod 99 extends upwardly through an opening in the frame and is pressed upwardly by a spring 101 mounted between the frame and a collar 102 on the rod. Cam 97 may be provided with an adjustable portion 110 to vary the period of operation of the rod 98 and thereby vary the time that the valve 23 is open. Adjacent the upper end of the rod 99 an arm or link 103 is connected to it, the arm or link having a forked end 104 (see Fig. 1) which surrounds the rod and receives a pin which passes through the rod. This arm 103 is pivotally mounted in a bracket 105 carried by a plate 105' on the top of the container. Beyond its pivot it is received in a forked end 106 of the valve 23 and is secured thereto by means of a pin 106'. A spring 107 is connected to the arm 103 adjacent its free end and the other end of the spring is secured to a pin 108 on the side of the container 16. It will be apparent that when the arm 99 is elevated, the end of the arm 103 which carries the valve 23 will be in a lowered position to close the valve. When arm 98 rides over cam 97, the arm 99 is depressed and the valve 23 is raised to the position shown in Fig. 3 of the drawings. Springs 101 and 107 therefore normally tend to retain the valve in closed position except when it is opened by action of the cam 97.

In Figs. 7 and 8 I have shown means for controlling the operation of the valve 23. As shown, the forked end 104 of arm 103 receives a block 120 and this block is provided with a central bore through which the rod 99 freely passes. The end of the rod 99 is threaded as at 121 and a nut 122 and a lock nut 123 are mounted thereon. The upper surface of the block 120 is provided with a V-shaped groove 124 of suitable depth and a second groove 125 at right angles thereto of considerably less depth. A block 126 is mounted on the rod 99 between the block 120 and the nut 122 and is provided with a V-shaped lower end 127. The nuts 122 and 123 may be adjusted longitudinally of the rod 99 to vary the space between the nut 122 and the block 126. As shown there is a certain amount of lost motion in this connection so that rod 99 moves downwardly a certain distance before engaging the block 126 to swing the lever 103 on its pivot and operate the valve. By regulating the space between these two members the amount that the valve is opened and therefore the feed of the material may be regulated. The block 126 is shown with its lower end 127 in the shallow groove 125 of the block 120. This is the operative position. When it is desired to operate the machine without actuating the valve 23, the block 126 is first moved upwardly to remove it from the shallow groove 125, then turned at right angles and the end 127 arranged in the deeper V-shaped groove 124. This permits the block 126 to move downwardly on the rod 99 away from the nut 122 and by properly proportioning the parts to the movement of the rod 99 this distance may be such that the lowering of the rod 99 fails to bring the nut 122 into engagement with the block 126 and thereby fails to operate the valve.

In Figs. 9 and 10 of the drawings I have shown details of the upper plunger by means of which the molded lip stick is inserted into the casing. The base portion of a lip stick holder generally comprises a casing 130 and an elevator 131. The lip stick is secured in the elevator which is normally in a retracted position in the casing but which is brought to its extended position when the lip stick is being used. When the lip stick casings are placed on the lip sticks at station A of Fig. 1 the elevator is in its extended position. In some constructions of lip stick holders the elevator moves freely into the casing when axial pressure is applied but in some instances the feed and retraction of the elevator is controlled by rotary movement. Where the lip stick elevator is moved by axial pressure, it is generally provided with a finger piece 132 projecting through a slot in the casing. When it is desired to retain the elevator in extended position while the lip stick is being forced into the die, I provide a spring finger 133 on the side of the sleeve 35, the spring finger being secured to the sleeve by rivets 136. The spring finger 133 projects through a slot in the head 36 and its lower end 137 engages the finger piece 132 to prevent movement of the elevator 131 into the casing 130 when pressure is applied by the plunger 10.

Fig. 10 shows the details of the upper plunger when the finger 133 is not employed. Where the elevator 138 is moved into the casing 139 by relative rotation of the two parts, the elevator will be retained in its extended position when axial pressure is applied.

The operation of the device will be apparent from the foregoing description. All the parts of the machine are driven from shaft 43 which is connected to a prime mover in any suitable manner as by a chain passing over the sprocket wheel 45. Step by step movement is imparted to the table by pawl 54 and ratchet 56, the oscillation of the collar 53 by link 50 causing the pawl to engage the ratchet teeth upon movement in a clock-wise direction in Fig. 1 of the drawings and to ride over the teeth upon movement in a counter-clockwise direction. This indexes the tables 3 and 4 and the movement of the tables is controlled by the brake member 95 and the locking arm 86—87. When the arm 87 is lowered by cam 89 the horizontal arm 86 engages one of the collars 11 of the plungers 10 to stop the tables in the proper position. This brings one of the dies under the spout 17 and a proper amount of molten lip stick material is delivered to the die from the container 16, the feed of the material being controlled by cam 97 and by the adjustment of the nut 122. During the entire operation, except during the forcing of the lip stick material into the lip stick holder and the ejection of the lip stick and holder from the machine, the plungers 10 are in position within the die forming the bottom of the die and the lip stick material is delivered on to the top of the plunger. The construction of the feed valve and seat causes the molten material to be delivered into the center of the die as shown in Fig. 3 of the drawings and prevents it from being spattered on the side wall of the die which might produce a final product having rough or uneven surfaces. Various sized dies may be employed to make lip sticks of different sizes, the dies being removable from the table 3 and the length of the lip sticks may be regulated by employing plungers of different lengths or adjusting the position of the end of the plunger in the die by changing the position of the collars 11.

After the lip stick material has been placed in the die, the die moves around the table in a clock-wise direction in Fig. 1 of the drawings and at station A an operator places the base portion of a lip stick holder over the die in inverted position as shown in Fig. 3 of the drawings. The recessing of the top of the die shown at 27 facilitates proper placing of the lip stick holders. As the lip stick and holder move around the table in the die, the lip stick material cools. Operating on a machine of this character permits material to be used at lower temperatures than those heretofore employed in the hand manufacture of lip sticks and this, of course, causes the lip sticks to cool in less time. Normally the use of dies with fins 100 is sufficient to cause the lip sticks to cool before ejection from the machine but the hood 28 is provided and in extremely hot weather a blast of cold air may be fed over the dies through the pipe 29. When the die reaches station B, the upper plunger is lowered by cam 62 and the associated links and levers until it engages the bottom of the inverted lip stick holder as shown in Fig. 3. At the same time cam 59 raises tappet 31 to move the lower plunger 10 upwardly and force the lip stick material into the elevator 132 or 138 as shown in Figs. 9 and 10 of the drawings. As the plunger 10 is raised, it passes cam 73, the cam springing outwardly against spring 76 when it is engaged by the inclined upper surface of the collar 11 and then moving inwardly under the tension of spring 76 to engage the bottom of the collar and retain the plunger in raised position. At this station the lip stick material is forced into the elevator of the lip stick holder and if the elevator is free to move into the base of the holder, it moves to the position shown at the next station but the end of the lip stick holder remains in position in the recess 27. As the collar rides off the cam 73, it rides on to cam 80 and the upward incline of this cam moves the plunger upwardly an additional distance which lifts the lip stick holder from the recess 27. In some instances the lip stick holder is then removed by hand, but where the automatic ejecting mechanism is provided, tappet 39 engages the plunger, the tappet being elevated by cam 83, to move it upwardly an additional distance and cause the inverted lip stick holder to contact with the inclined plate 40. The upward movement of the pointed end 13 of the plunger in passing from station B to station C cleans the side walls of the die and removes all lip stick material therefrom. The V-shaped notch in the top of the plunger extends radially of the machine and this facilitates the ejection of the completed lip stick when the bottom of the holder engages the inclined plate 40 and the lip stick and holder are tilted. The lip stick and holder then fall over the incline 41 on to the moving belt 42. After the collar passes off of the cam 80 it engages the downwardly inclined surface 81 of a plate bolted to the frame of the machine to positively feed the plunger to its lower position before the filling operation. At the time of the filling operation the collar is between the lower surface 82 of this plate and the table so as to be positively retained in its lowermost position.

I claim:

1. In mechanism for mounting a lip stick in a holder, a die open at each end, a lower plunger in the die, means for delivering lip stick material to the die in molten condition, the upper end of the die being provided with means for receiving a lip stick holder in inverted position, an upper plunger to engage the inverted holder, said plunger being spring pressed and means for moving the lower plunger upwardly in the die.

2. Apparatus for manufacturing lip sticks comprising a rotating table, dies arranged adjacent the periphery of the table, means for feeding molten lip stick material to the dies at one point in the rotation of the table, a hood spaced from the delivery point of the material and covering the peripheral edge of the table throughout an appreciable portion of the path of the dies, means for delivering air to the hood to cool the material in the dies, and means beyond the hood for ejecting molded lip sticks from the dies.

3. In mechanism for mounting a lip stick in a holder, a die open at each end, a lower plunger arranged in the die, means for delivering lip stick material to the die in a molten condition, the upper end of the die being provided with means for receiving a lip stick holder in inverted position, an upper plunger arranged in the path of travel of the die, means for reciprocating the upper plunger, a spring pressed head carried by the upper plunger to engage the lip stick holder and center it, and means for moving the lower plunger upwardly in the die while the lip stick holder is engaged by the head to force the material into the holder.

4. Apparatus of the character described comprising a rotating table, a die mounted on the table, the upper end of the die being recessed to center an inverted lip stick holder arranged thereon with respect to the die, means in the path of travel of the die to feed lip stick material into the die, an upper plunger arranged in the path of travel of the die, means for reciprocating the upper plunger, a spring pressed head carried by the upper plunger to engage the lip stick holder and center it, and means for forcing the material into the holder while it is being held by the spring pressed head.

5. Apparatus of the character described comprising a rotating table, a die mounted on the table, the upper end of the die being recessed to center an inverted lip stick holder arranged thereon with respect to the die, means in the path of travel of the die to feed lip stick material into the die, an upper plunger arranged in the path of travel of the die, means for reciprocating the upper plunger, a spring pressed head carried by the upper plunger, the lower face of the spring pressed head being recessed to receive the end of the lip stick holder and center it, and means for forcing the material into the holder while it is engaged by the spring pressed head.

CLIFFORD M. JOHNSON.